(12) United States Patent
Stephan et al.

(10) Patent No.: US 7,376,821 B2
(45) Date of Patent: May 20, 2008

(54) DATA PROCESSING SYSTEM AND METHOD

(75) Inventors: Yann Stephan, Echirolles (FR); Paul Neuman, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 10/902,294

(22) Filed: Jul. 30, 2004

(65) Prior Publication Data

US 2005/0027976 A1 Feb. 3, 2005

(30) Foreign Application Priority Data

Aug. 1, 2003 (EP) .................................. 03291953

(51) Int. Cl.
*G06F 15/177* (2006.01)
*G06F 9/445* (2006.01)

(52) U.S. Cl. .............................. 713/1; 713/2; 713/100; 714/2; 714/3; 714/36; 714/38; 714/203

(58) Field of Classification Search ............ 713/1–100; 714/22–33, 2, 3, 36, 38, 203
See application file for complete search history.

(56) References Cited

U.S. PATENT DOCUMENTS

| 5,489,914 | A |   | 2/1996  | Breed |
| 5,768,162 | A | * | 6/1998  | Rupp et al. ............... 702/186 |
| 5,835,760 | A | * | 11/1998 | Harmer ..................... 713/2 |
| 5,887,163 | A | * | 3/1999  | Nguyen et al. ............ 713/2 |
| 6,016,536 | A | * | 1/2000  | Wu et al. ................... 711/173 |
| 6,185,678 | B1 | * | 2/2001  | Arbaugh et al. ........... 713/2 |
| 6,272,611 | B1 | * | 8/2001  | Wu ............................ 711/173 |
| 6,272,629 | B1 | * | 8/2001  | Stewart ..................... 713/2 |
| 6,381,694 | B1 | * | 4/2002  | Yen ........................... 713/2 |
| 6,385,721 | B1 | * | 5/2002  | Puckette .................... 713/2 |
| 6,615,365 | B1 | * | 9/2003  | Jenevein et al. .......... 714/6 |
| 6,633,976 | B1 | * | 10/2003 | Stevens ..................... 713/2 |
| 6,711,660 | B1 | * | 3/2004  | Milne et al. .............. 711/173 |
| 6,772,313 | B2 | * | 8/2004  | Oh ............................ 711/173 |
| 6,779,109 | B2 | * | 8/2004  | Stevens ..................... 713/1 |
| 6,857,011 | B2 | * | 2/2005  | Reinke ...................... 709/220 |
| 6,862,681 | B2 | * | 3/2005  | Cheston et al. ........... 713/2 |
| 6,901,493 | B1 | * | 5/2005  | Maffezzoni ................ 711/162 |
| 6,934,833 | B2 | * | 8/2005  | Larvoire ..................... 713/1 |
| 6,944,867 | B2 | * | 9/2005  | Cheston et al. ........... 719/327 |
| 6,978,363 | B2 | * | 12/2005 | Larvoire ..................... 713/1 |

(Continued)

FOREIGN PATENT DOCUMENTS

EP        0 829 110 A      3/1998

(Continued)

OTHER PUBLICATIONS

Lebbar, H., et al., "Analysis and size reduction of various printed monopoles with different shapes", Electronic Letters, IEE Stevangae, vol. 30, No. 21, pp. 1725-1726 (Oct. 1994).

*Primary Examiner*—Rehana Perveen

(57) ABSTRACT

Embodiments provide a data processing system comprising first initialisation software to initialise the data processing system, means to access storage comprising a first region and a second region comprising first software; the system further comprising second initialisation software arranged, using information associated with the second region, to access the second region to launch the first software.

28 Claims, 2 Drawing Sheets

U.S. PATENT DOCUMENTS

| | | | |
|---|---|---|---|
| 7,024,581 B1 * | 4/2006 | Wang et al. | 714/2 |
| 7,032,107 B2 * | 4/2006 | Stutton et al. | 713/2 |
| 7,047,403 B2 * | 5/2006 | Lin | 713/100 |
| 2003/0177329 A1 * | 9/2003 | Lavoire et al. | 711/173 |
| 2003/0182547 A1 * | 9/2003 | Kumagai | 713/2 |
| 2004/0221150 A1 * | 11/2004 | Maynard et al. | 713/2 |
| 2004/0255106 A1 * | 12/2004 | Rothman et al. | 713/1 |

FOREIGN PATENT DOCUMENTS

| | | | |
|---|---|---|---|
| EP | 1 189 305 A | | 3/2002 |
| EP | 1274009 A2 | * | 1/2003 |
| EP | 1329800 A1 | * | 7/2003 |
| WO | WO 9812636 A1 | * | 3/1998 |

* cited by examiner

DATA PROCESSING SYSTEM AND METHOD

FIELD OF THE INVENTION

The present invention relates to a data processing system and method.

BACKGROUND TO THE INVENTION

Modern computers have become very sophisticated in the range of services they can offer. Not only can computers be used for the conventional day-to-day processing tasks, they invariably contain some software, diagnostics software for example, that can assist in the event of a malfunction of the computer. Usually, the diagnostics software is specific to the manufacturer or distributor of the computer system. For example, Hewlett Packcard Company has very sophisticated diagnostics and technical support tools and processes, which can be immensely useful in the event of a malfunction.

However, once a customer has taken possession of a computer there is little that can be done to protect the support or diagnostics software. In particular, large organisations that use a significant number of computers might find it cost effective to roll-out those computers using exactly the same HDD image on all computers; that image having been thoroughly tried and tested. This approach allows the organisation to reduce their IT infrastructure and support costs. Often the process of creating identical disc images involves reformatting the HDD or removing existing software and replacing it with alternative software. In either case, there is a significant risk that the diagnostics and support software described above will be at least corrupted and possibly removed completely.

The structure of a physical disc such as, for example, an HDD, is such that it contains a number of primary partitions. A primary partition is a portion of a physical disc that functions, in effect, as a separate disc. For master boot record (MBR) discs, up to four primary partitions can be created, or three primary partitions together with an extended partition. For basic GUID partition table (GPT) discs, up to 128 primary partitions can be created. Extended partitions, which can be created for master boot record discs only, are useful if more than four volumes are required on a basic MBR disc.

It is often the case that discs are partitioned into at least two portions. The first portion is known as a data portion and is used, as is conventional, to hold the operating system and any associated applications and data stemming from the operating system or applications. A second portion of such a partitioned disc might be a hidden partition that is usually inaccessible to all but the most sophisticated of computer users due to their specialist nature. Furthermore, conventional applications that run on top of an operating system can only access and manipulate data and software contained within the partition or partitions to which the operating system belongs. Therefore, it can be appreciated that the hidden partition is inaccessible to such applications, which include applications for creating disc images Therefore, hidden partitions are used by computer manufacturers to store technical support software such as the above-described diagnostics software. This software might be used to provide technical support to a user in the event that the user's computer has suffered a fault even if the disc has been reformatted or a disc image has been used to over-write an existing disc image.

However, the hidden partition, and, therefore, the software and data contained within such a hidden partition are accessible only from the BIOS. It will be appreciated that BIOS manufacturers are separate legal entities to the computer manufacturers. Therefore, there is currently little computer manufacturers can do to control or encourage access to the hidden partition by altering the system BIOS as the content of the system BIOS is under the control of a third party. Furthermore, having an uncorrupted system BIOS is crucial to the correct operation of the computer. Therefore, altering the system BIOS is not to be undertaken lightly, which implies that access to the software and data within the hidden partition is not generally available.

It is an object of embodiments of the present invention at least to mitigate some of the problems of the prior art.

SUMMARY OF INVENTION

Accordingly, a first aspect of embodiments of the present invention provides a data processing system comprising first initialisation software to initialise the data processing system, means to access storage comprising a first region and a second region comprising first software; the system further comprising second initialisation software arranged, using information associated with the second region, to access the second region to launch the first software.

Advantageously, embodiments of the present invention are able to provide at least one of a reduced "time to operating system", a flexible manner of providing access to software or a flexible manner of initialising a computer.

Preferably, the storage comprises non-volatile storage such as, for example, an HDD. Embodiments are provided in which the second initialisation software derives the information from configuration data associated with the storage. Preferably, the configuration data is derived from a master boot record.

In preferred embodiments the first initialisation software comprises system BIOS code. Furthermore, in preferred embodiments, the second initialisation software comprises option ROM code. Preferably, the option ROM code is not intended for initialising hardware.

Preferred embodiments provide a data processing system in which the second region comprises at least second software and the second initialisation software comprises a launcher to execute selectively at least one of the first and second software.

Further embodiments provide a data processing system in which the first software comprises diagnostics software. The first software might comprise at least BIOS level executable code. Alternatively, the first software might comprise at least one of option ROM code, a BIOS image or at least part of a BIOS image.

Preferably, embodiments provide a data processing system in which the second software comprises at least one of option ROM code, a BIOS image or at least part of a BIOS image.

A further aspect of embodiments of the present invention provides a data processing system comprising a system BIOS, an option ROM, and a non-volatile storage having first partition and a hidden partition, storing at least first software, accessible and inaccessible respectively by at least an operating system; the option ROM being arranged to support access to the second partition to allow the first software to be executed.

A still further aspect of embodiments of the present invention provides a data processing method for operating a computer system; the computer system comprising first initialisation code, second initialisation code and means to access a storage device; the storage device comprising a first storage region and a second storage region storing first software; the second storage region being invisible to at least an operating system; the method comprising the steps of executing the second initialisation code to access the first software stored by the second storage region and executing the first software.

It will be appreciated that embodiments of the present invention can be realised using software, hardware or a combination hardware and software. Suitably, embodiments provide a computer program comprising code to implement a system or method as described below. Furthermore, such code can be distributed in a number of forms such as, for example, via the Internet, in a chip, on an optical disc, on a magnetic disc or via any other suitable means. Accordingly, embodiments provide a computer program product comprising such a computer program.

Other aspects of embodiments of the present invention are described below and claimed in the claims.

BRIEF DESCRIPTION OF THE DRAWINGS

Embodiments of the present invention will now be described, by way of example only, with reference to the accompanying drawings in which.

DESCRIPTION OF PREFERRED EMBODIMENTS

Figure 1:
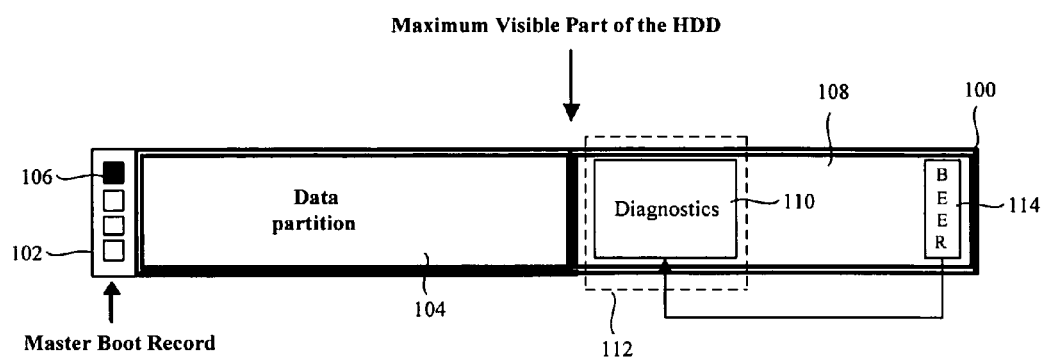
FIG. 1 shows, schematically, a partitioned disc.

Referring to FIG. 1, there is shown, schematically, a partitioned disc 100. The partitioned disc 100 comprises a master boot record 102, a first partition 104, which is visible to an operating system (not shown) and applications (not shown) that run on top of the operating system according to whether or not a first flag 106, of four flags conventionally forming part of the master boot record 102, is set. The disc 100 also comprises a hidden partition 108. The hidden partition 108 is not visible to the application and the operating system.

The hidden partition 108 comprises, for example, diagnostics software 110 that can be invoked during, or as part of, the boot process to assess the state of health of an associated computer (not shown). The diagnostics software 110 is stored, preferably, within a protected area 112 as defined by the "Protected Area Runtime Interface Extension Service", the details of which are disclosed in ANSI NCIS 317-1998, which is incorporated herein by reference for all purposes.

A BIOS engineering extension record (BEER) 114, which resides in the last sector of the disc 100, is used to locate the protected area 112. In particular, bit 5 of the capabilities word (not shown) together with, for example, the Diagnostic Boot Code Address, which specifies the absolute address of the diagnostics software 110, are used by the BIOS to locate and execute the diagnostics software 110. Alternatively, or additionally, code or data associated with another service area might be accessed via an appropriately defined directory of service entry of the directories of services (not shown) that is accessible via the BEER 114.

Figure 2:
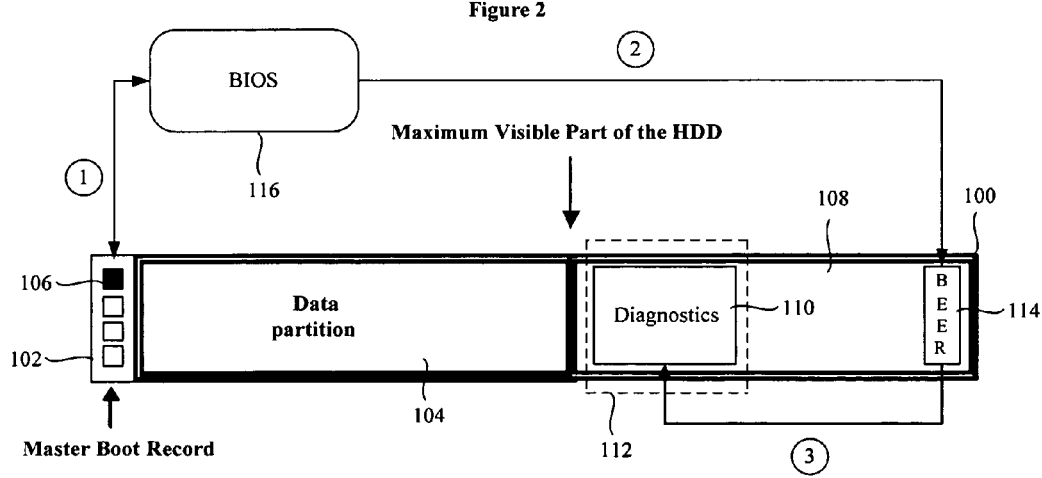
FIG. 2 shows a partitioned disc and a process for accessing diagnostics software stored on that disc.

FIG. 2 shows how the BIOS 116 provides access to the diagnostics software 110. The BIOS 116, as illustrated at step 1, reads the master boot record 102 and, in turn, the partition table (not shown), to obtain an indication of the capacity of the disc 100, which will, in turn, allow the BIOS to access the last sector of the disc to access the BEER 114. As will be appreciated by those skilled in the art, the MBR partition table will contain, at offsets 000h, 1BEh, 1CEh, 1DEh, 1EEh and 1FEh, the boot code, a $1^{st}$ partition entry, a $2^{nd}$ partition entry, a $3^{rd}$ partition entry, a $4^{th}$ partition entry and a boot record signature (55AAh) respectively. Having obtained the MBR data, the BIOS can access the BEER 114 as shown in step 2, which will allow the BIOS to locate the diagnostics software 110 at step 3. However, it will be appreciated from the above, that the BIOS must be specifically arranged to be able to access the diagnostics software 110. Since computer manufacturers are not, generally, producers of BIOSes, imbuing the system BIOS 116 with the ability to access the diagnostics software 110 contained within the hidden partition is not a straight-forward and risk free venture.

As part of the initialisation of any computer, the BIOS undergoes an initialisation process. The initialisation process involves, amongst other things, loading various option ROMs that are needed to initialise various hardware contained within the computer. The system BIOS 116 loads each available option ROM (not shown) into an appropriate place within memory and then hands over control to the loaded option ROM, which, in turn, executes and, having initialised any corresponding hardware, hands over control back to the system BIOS 116.

Figure 3:
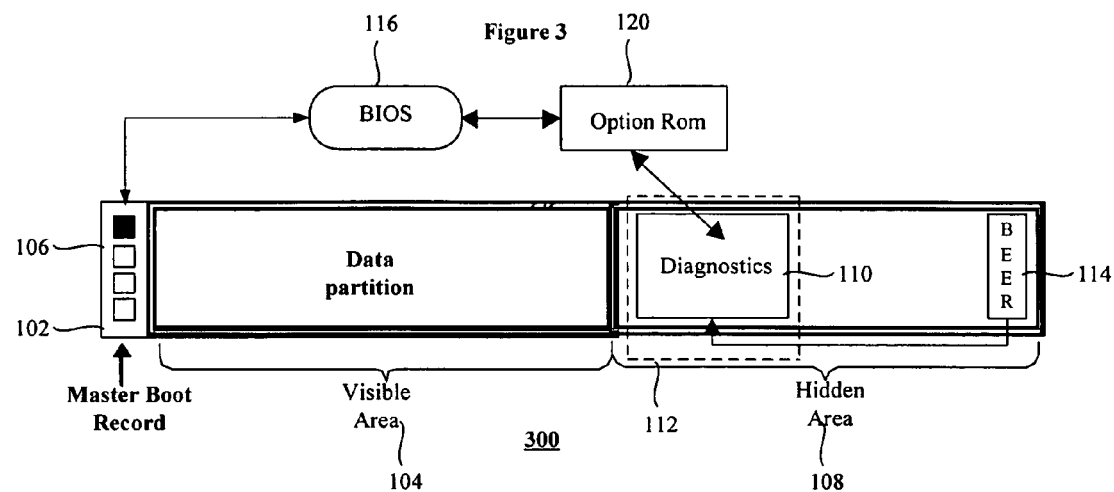
FIG. 3 shows a partitioned disc and an access process according to a first embodiment of the present invention.

Therefore, referring to FIG. 3, there is shown an embodiment 300 of the present invention. The BIOS 116, upon initialisation of the computer (not shown), is arranged to load a fake option ROM 120 into memory. The fake option ROM 120 code might be stored together with, or separately from, the BIOS code or might form part of the BIOS code. The BIOS 116 and fake option ROM 120 are embodiments of first and second initialisation software respectively.

The loaded option ROM code is stored in memory, for example, at D4000h-D7FFFh, having, for example, loaded a video option ROM and a LAN option ROM at C0000h-C7FFFh and C8000h-D3FFFh respectively. It will be appreciated that the fake option ROM 120 does not correspond to an adapter card that is initialised using that option ROM 120. This is in contrast to the video option ROM and LAN option ROM, which will be used to initialise a video card and a LAN card respectively. The option ROM 120 comprises BIOS, or BIOS level, executable code that does not have associated hardware to initialise.

The option ROM 120 is arranged to access and instigate the execution of the diagnostics software 110. In one embodiment, the opportunity to execute the option ROM code will be presented to the user of a computer when they press an appropriate key such as, for example, F2 or Del, during the boot phase of a computer to gain access a BIOS menu, that is, the BIOS menu can be arranged to contain a selectable entry to allow the user to execute the option ROM code. As mentioned above, the BIOS engineering extension record (BEER) 114, which resides in the last sector of the disc 100, is used to locate the diagnostics software 110 within the protected area 112. In particular, bit 5 of the capabilities word (not shown) together with, for example, the Diagnostic Boot Code Address, which specifies the absolute address of the diagnostics software 110, are used by the BIOS to locate and execute the diagnostics software 110. Therefore, the option ROM code 120 is arranged to read the BEER 114 to locate and execute the diagnostics software 110. The diagnostics software 110 is arranged to return control to the option ROM 120 once it has finished executing. The option ROM 120 is arranged to return control to the system BIOS 116 once it has finished executing.

It can, therefore, be appreciated that a computer manufacturer can provide improved BIOS level functionality without having to modify the system BIOS supplied by a BIOS manufacturer. It can be appreciated that this has the dual benefit of ensuring that the system BIOS does not have to be modified, which at least reduces and, preferably, eliminates any risk associated with altering the system BIOS, and allows the computer manufacturer to provide its own diagnostics software that can be tailored to the particular needs of an application or use of the computer or to meet the needs of a customer and to take into account any particular hardware or software requirements of the computer within which embodiments are realised.

Although embodiments of the present invention have been described with reference to the hidden partition comprising diagnostics software, embodiments are not limited to such arrangements. Embodiments can be realised in which other software or data are stored within the hidden partition.

Figure 4:
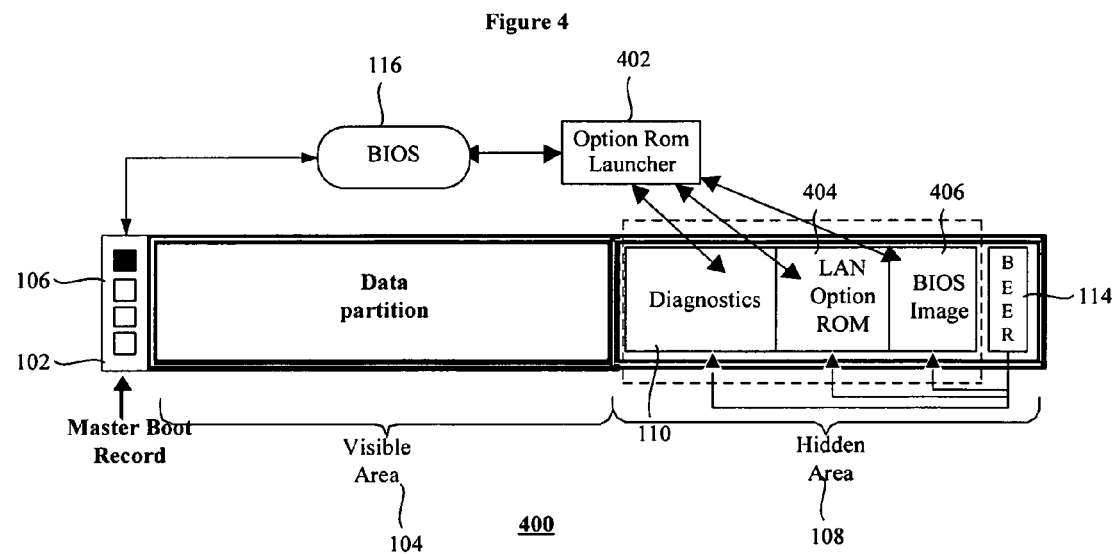
FIG. 4 shows a partitioned disc and an access mechanism for a second aspect of embodiments of the present invention.

FIG. 4 shows schematically a second embodiment 400 of the present invention. In the second embodiment 400, an option ROM launcher 402 can launch a number of software entities such as, for example, the diagnostics software 110, a LAN option ROM 404 and a BIOS image 406. The function of the option ROM launcher 402 is to access option ROMs, or other software or data, stored within the hidden partition 108, and to make that hidden software available for execution on a selective basis. For example, if the BIOS 116 or operating system (not shown) detected a fault with the computer (not shown) during the most recent period of operation, the BIOS 116 can be arranged to request the option ROM launcher 402 to make the diagnostics software 110 available to the BIOS 116 to allow diagnostics testing to be performed. It will be appreciated that option ROM launcher is an embodiment of second initialisation software.

Using the option ROM launcher 402 to make the hidden applications or hidden option ROMs available on a selective basis allows the computer (not shown) to be configured at boot-up according to the needs of that computer. This is in contrast to prior art boot processes in which, for example, option ROMs for all devices that are detected as being present during the boot sequence are loaded and executed prior to loading and executing the operating system loader. A typical boot or power up sequence involves the following steps (1) physical power up; (2) initialisation of hardware; (3) initialisation of BIOS services; (4) detection of PCI devices; (5) allocation of resources I/O port, MMIO and IRQ; (6) loading and executing of option ROMs; (7) loading and executing the operating system loader; and (8) handing over control to the operating system. Step (6) of the above process might involve a relatively large number of option ROMs. Loading and executing such a relatively large number of option ROMs might take a relatively long period of time, which could be undesirable if there are tight time constraints imposed upon the so-called "time to operating system" condition.

The selective execution of various option ROMs might be used by embodiments to reduce the "time to operating system" time. For example, if a LAN option ROM 404 is available and required for the correct operation of a PCMCIA network or LAN card and if, for example, a laptop, with that card, is booted without having been connected to the LAN, loading and executing the LAN option ROM 404 might serve little purpose. Suitably, the option ROM launcher 402 is sufficiently sophisticated to identify the option ROMs needed by the BIOS 116 in advance and to load and execute only those option ROMs that are required.

If the computer is connected subsequently to the LAN and a LAN services is required, the option ROM can be arranged to intercept interrupts or calls associated with the LAN service and to load and execute the LAN option ROM 404.

A still further use of the option ROM launcher 402 is to ensure that the BIOS 116 has access to the most recent versions of the software stored within the hidden partition 108, that is, the most recent versions of the various option ROMs and diagnostics tools stored within that partition 108.

Furthermore, rather than the BIOS 116 being all encompassing, that is, containing all software that it might need to perform its function, the BIOS 116, in some embodiments, can be broken down into self-contained functional units. For example, the BIOS 116 might be split into the following parts: AGP init, IDE0 channel init, IDE1 channel init, ISA init, PCI init, etc. In some instances, the operating system does not always require, for example, a sound card or video card to have been initialised prior to the OS loader loading the operating system, since the operating system itself will initialise some devices. The option ROM launcher is arranged to load and execute those option ROMs that might not be loaded and executed by the OS or other software. Again, this has the benefit of allowing a faster "time to operating system" to be realised. Furthermore, it will save on processing effort, since, in some instances, the operating system will not re-initialise devices that could otherwise have already been initialised by the BIOS since the BIOS will not have previously initialised those devices.

Still further, when the software of the computer is updated, only those self-contained functional units that have changed need to be updated. Therefore, once a unit has been updated, the next time the computer performs a boot sequence, the BIOS 116 will access and retrieve the most recent option ROM or software. It can be appreciated that this would greatly simplify the process of updating, for example, the BIOS 116 itself. Rather than having to flash memory with a complete BIOS 116, which bears a high degree of risk, one skilled in the art merely needs to load the updates into the appropriate area within the hidden partition 108.

The selective loading of option ROMs or software for use by the BIOS 116 might save time in performing the boot process or boot sequence.

Further embodiments of the present invention provide a relatively simple and unsophisticated BIOS 116 that is able to perform only the most rudimentary functions with most of the BIOS code being stored as a BIOS image 406, or as a number of parts of such a BIOS image, within the hidden partition 108. Therefore, in a manner analogous to the BIOS loading an operating system loader to install and hand-over control to the operating system, a relatively simple BIOS might use the option ROM launcher 402 in a comparable manner and use it to load and execute the BIOS image 406 or parts of such a BIOS image. Again, this has the advantage that the BIOS image 406, or parts of the BIOS image, can be updated in a relatively simple manner, that is, it, or they, can be written to a non-volatile storage device such as an HDD rather than it having to be written to flash memory. Also, updating parts of a BIOS image, rather than the whole image, has the advantage that any problems associated with the update might not be fatal to booting the computer after such an update. Furthermore, the errors, if any, are confined to identifiable aspects of the BIOS image, which can then be reloaded or re-updated or restored. It will be appreciated that the time taken to update a relatively small part of a BIOS image might be significantly less than the time taken to flash a complete BIOS image.

It will be appreciated that embodiments can be realised in which the disc comprises more than one hidden partition; all or any of which might be made selectively visible to the software desiring access to the hidden partition or partitions and that each partition might support its own operating system, which might, in turn, require tailored versions of BIOS images to be loaded and executed. Therefore, embodiments of the present invention might use a rudimentary, or first BIOS, to load a particular BIOS associated with a particular operating system.

Conventionally, the system BIOS is stored within a flash memory on the motherboard of a computer. However, embodiments of the present invention are not limited thereto. Embodiments can be realised in which the system BIOS, and, optionally, the fake option ROM, or other option ROMs, are not co-located, that is, they do not form part of the computer system but are accessible, using a suitable communication interface or arrangement. For example, the BIOS might be accessible via a network and network adapter card or chip-set. Therefore, it will be appreciated that the MBR is merely one example of configuration data associated with storage that provides an indication of the format of that storage.

Embodiments of the present invention have been described with reference to an HDD, which is formatted to have partitions. However, embodiments can be realised in which some other form of storage, non-volatile or volatile, is used. It will be appreciated that any such volatile or non-volatile other storage might not comprise partitions and that partitions represent merely one example, of first and second storage regions of storage. Examples of such storage comprise EEPROM, ROM, EPROM, optical storage or optical storage devices, RAM, flash memory and any other type of storage.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) might be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processing system comprising first initialization software to initialize the data processing system, means to access storage comprising a first region and a second region comprising first software; the first initialization software configured to load simulated second initialization software arranged and configured to locate and execute diagnostic software, using information associated with the second region, to access the second region to launch the first software, wherein the first software is arranged to return control to the simulated second initialization software once the first software has finished executing and the simulated second initialization software is arranged to return control to the first initialization software once the simulated second initialization software has finished executing.

2. A data processing system as claimed in claim 1 in which the storage comprises non-volatile storage.

3. A data processing system as claimed in claim 2 in which the storage comprises an HDD.

4. A data processing system as claimed in claim 1, in which the simulated second initialization software derives the information from configuration data associated with the storage.

5. A data processing system as claimed in claim 4 in which the configuration data is derived from a master boot record.

6. A data processing system as claimed in claim 1, in which the first initialization software comprises system BIOS code.

7. A data processing system as claimed in claim 1, in which the simulated second initialization software comprises option ROM code.

8. A data processing system as claimed in claim 7 in which the option ROM code is not intended for initializing hardware.

9. A data processing system as claimed in claim 1, in which the second region comprises at least second software and the simulated second initialization software comprises a launcher to execute selectively at least one of the first and second software.

10. A data processing system as claimed in claim 9 in which the simulated second software comprises at least one of option ROM code, a BIOS image or at least part of a BIOS image.

11. A data processing system as claimed in claim 1, in which the first software comprises diagnostics software.

12. A data processing system as claimed in claim 1, in which the first software comprises at least BIOS level executable code.

13. A data processing system as claimed in claim 1, in which the first software comprises at least one of option ROM code, a BIOS image or at least part of a BIOS image.

14. A data processing system comprising a system BIOS, a simulated option ROM loaded by the system BIOS, and a non-volatile storage having a first partition and a hidden partition, storing at least first software, accessible and inaccessible respectively by at least an operating system; the simulated option ROM being configured to locate and execute diagnostic software, and arranged to support access to the hidden partition to allow the first software to be executed, wherein the first software is arranged to return control to the simulated option ROM once the first software has finished executing and the simulated option ROM is arranged to return control to the system BIOS once the simulated option ROM has finished executing.

15. A data processing method for operating a computer system; the computer system comprising first initialization code, simulated second initialization code configured to locate and execute diagnostic software, and loaded by the first initialization code and means to access a storage device; the storage device comprising a first storage region and a second storage region storing first software; the second storage region being invisible to at least an operating system; the method comprising the steps of executing the simulated second initialization code to access the first software stored by the second storage region and executing the first software, wherein the first software is arranged to return control to the simulated second initialization code once the first software has finished executing and the simulated second initialization code is arranged to return control to the first initialization code once the simulated second initialization software has finished executing.

16. A data processing method as claimed in claim 15 in which the storage comprises non-volatile storage.

17. A data processing method as claimed in claim 16 in which the storage comprises an HDD.

18. A data processing method as claimed in claim 15, in which the simulated second initialization software derives information for accessing the second storage region from configuration data associated with the storage device.

19. A data processing method as claimed in claim 18 in which the configuration data is derived from a master boot record.

20. A method as claimed in claim 15, in which the first initialization software comprises system BIOS code.

21. A method as claimed in claim 15, in which the simulated second initialization software comprises option ROM code.

22. A method as claimed in claim 21 in which the simulated second initialization software is not intended to initialize hardware.

23. A method as claimed in claim 15, in which the second region comprises at least second software and the method comprises the step of selectively executing at least one of the first and second software.

24. A method as claimed in claim 23 in which the second software comprises at least one of option ROM code, a BIOS image or at least part of a BIOS image.

25. A method as claimed in claim 15, in which the first software comprises diagnostics software.

26. A method as claimed in claim 15, in which the first software comprises at least BIOS level executable code.

27. A method as claimed in claim 15, in which the first software comprises at least one of option ROM code, a BIOS image or at least part of a BIOS image.

28. A computer program product comprising computer readable storage storing a computer program as claimed in claim 15.

* * * * *